(12) United States Patent
Morris et al.

(10) Patent No.: US 10,748,050 B2
(45) Date of Patent: Aug. 18, 2020

(54) RFID CAPS AND LIDS

(71) Applicant: CRYOGATT SYSTEMS LTD, Buxted, Sussex (GB)

(72) Inventors: Geoffrey Morris, Buxted (GB); Malcolm Hunt, Buxted (GB)

(73) Assignee: CRYOGATT SYSTEMS LIMITED, Buxted Sussex (GB)

( * ) Notice: Subject to any disclaimer, the term of this patent is extended or adjusted under 35 U.S.C. 154(b) by 676 days.

(21) Appl. No.: 14/772,743

(22) PCT Filed: Mar. 7, 2014

(86) PCT No.: PCT/GB2014/050675
§ 371 (c)(1),
(2) Date: Sep. 3, 2015

(87) PCT Pub. No.: WO2014/135890
PCT Pub. Date: Sep. 12, 2014

(65) Prior Publication Data
US 2016/0026911 A1    Jan. 28, 2016

(30) Foreign Application Priority Data

Mar. 8, 2013 (GB) .................................. 1304369.0
Apr. 3, 2013 (GB) .................................. 1305973.8

(51) Int. Cl.
*G06K 19/077* (2006.01)
*A61J 1/14* (2006.01)
(Continued)

(52) U.S. Cl.
CPC ...... *G06K 19/07758* (2013.01); *A61J 1/1418* (2015.05); *A61J 1/165* (2013.01);
(Continued)

(58) Field of Classification Search
CPC ........... G06K 19/07758; G06K 19/0776; A61J 1/1418; A61J 1/165; B65D 43/065; B65D 81/18; B65D 81/3827
See application file for complete search history.

(56) References Cited

U.S. PATENT DOCUMENTS 5,777,303 A * 7/1998 Berney ................. B01L 3/5453
                                                 235/375
8,152,367 B2 * 4/2012 Roberts .................... G01K 1/14
                                                 220/523
(Continued)

FOREIGN PATENT DOCUMENTS

EP    2301857    3/2011
EP    2371456    10/2011
(Continued)

OTHER PUBLICATIONS

United Kingdom Application No. 1304369.0, Search Report dated Sep. 13, 2013, 8 pages.
(Continued)

*Primary Examiner* — Steven A. Reynolds
*Assistant Examiner* — Javier A Pagan
(74) *Attorney, Agent, or Firm* — Kilpatrick Townsend & Stockton LLP

(57) ABSTRACT

The present invention relates to an RFID cap for a cryogenic vial, the RFID cap comprising a cap body; and an RFID tag attached to the cap body, the RFID tag comprising an RFID chip and an antenna connected to the chip. The present invention also relates to an RFID box lid for a cryogenic vial storage box having an array of storage slots capable of receiving cryogenic vials; the RFID box lid comprising: a box lid body; and an array of RFID tags positioned on the
(Continued)

box lid such that when the box lid is located on the storage box, each RFID tag in the array is aligned with a storage slot in the box.

16 Claims, 17 Drawing Sheets

(51) Int. Cl.
*A61J 1/16* (2006.01)
*B65D 43/06* (2006.01)
*B65D 81/18* (2006.01)
*B65D 81/38* (2006.01)

(52) U.S. Cl.
CPC .......... *B65D 43/065* (2013.01); *B65D 81/18* (2013.01); *B65D 81/3827* (2013.01); *G06K 19/0776* (2013.01); *G06K 19/07781* (2013.01)

(56) References Cited

U.S. PATENT DOCUMENTS

| | | | | |
|---|---|---|---|---|
| 8,388,905 | B2* | 3/2013 | Neel | G01N 33/48771 422/401 |
| 8,872,627 | B2* | 10/2014 | Davidowitz | B01L 3/545 340/10.1 |
| 2006/0065670 | A1* | 3/2006 | Doublet | B65D 75/327 221/1 |
| 2007/0023517 | A1* | 2/2007 | Tan | G06K 19/07749 235/435 |
| 2010/0141384 | A1* | 6/2010 | Chen | B65D 41/3409 340/10.1 |
| 2013/0027185 | A1* | 1/2013 | Lavi | B01L 9/06 340/10.1 |

FOREIGN PATENT DOCUMENTS

| | | |
|---|---|---|
| JP | 2005-321935 A | 11/2005 |
| JP | 2008021082 | 1/2008 |
| JP | 2005321935 A | 11/2017 |
| WO | 03023706 | 3/2003 |
| WO | 2007/024540 A1 | 3/2007 |
| WO | 2007024540 A1 | 3/2007 |

OTHER PUBLICATIONS

International Search Report and Written Opinion corresponding to the PCT/GB2014/050675 application.
European Application No. 19192914.0, European Search Report dated Feb. 20, 2020, 7 pages.

* cited by examiner

RFID CAPS AND LIDS

CROSS REFERENCE TO RELATED APPLICATIONS

This application is a U.S. National Stage Application under 35 U.S.C. § 371 of International Application No. PCT/GB2014/050675, filed on Mar. 7, 2014, which claims the benefit of and priority to GB Application No. 1304369.0, filed Mar. 8, 2013, and GB Application No. 1305973.8, filed on Apr. 3, 2013, all of which are hereby incorporated by reference in their entireties.

TECHNICAL FIELD

The present invention relates to an RFID cap, particularly to an RFID cap for a cryogenic vial.

The present invention also relates to an RFID box lid, particularly to an RFID box lid for a cryogenic vial storage box.

BACKGROUND

Biological samples may be preserved by cryogenic freezing. The biological samples are usually stored in disposable containers (disposables). The type of disposable container used depends on the type of sample. Examples of commonly used disposable containers include vials, straws and bags. The disposable container is stored at low temperatures in a Dewar flask typically filled with liquid nitrogen at a cryogenic temperature of −196° C.

Vials are generally tubular in shape, with a tubular wall defining a main longitudinal cavity (the sample cavity) for storage of the sample. The sample cavity can be sealed by a cap before storage of the sample under cryogenic conditions.

Where biological samples are stored in vials, it is common practice for multiple vials to be stored together in standardized storage boxes. Such storage boxes may for example have slots for 100 vials in a 10×10 array or slots for 169 vials in a 13×13 array. Storage boxes having many other configurations of n×m arrays exist. For example, a 3×3 array is often used for larger vials.

Commonly used sizes of vials include a diameter of 10 mm and a diameter of 12 mm although the diameter of the vial can be larger e.g. 25 mm.

Stored biological samples can be identified by writing on the disposable containers themselves or by writing on labels which are then attached to the containers. These labels may be handwritten or printed and can include bar codes.

The methods of identification described above have the disadvantage that written notes on containers can easily be erased or smudged and labels containing handwritten notes and printed text or barcode information can fall off the disposable containers while they are stored inside the Dewar leading to unidentifiable samples. These problems are exacerbated by the cold conditions in which biological samples must be kept.

Access to stored samples will occasionally be required, for example when performing an audit. However, when the samples are being accessed, they should not be allowed to warm up to temperatures greater than −130° C. It is therefore desirable to minimise the amount of time that a sample spends outside of the Dewar wherever possible.

Recording, monitoring and auditing of samples stored at cryogenic temperatures takes a considerable amount of time and effort, even when samples are labelled using barcodes. An additional and undesirable increase in the time taken to record or audit samples arises as a result of frost which forms on the surfaces of disposable containers and their labels when they are removed from liquid nitrogen into relatively warmer temperatures. It is common for samples to be stored for many years (e.g. 15 years) but even after just one year in storage, the layer of frost which builds up on a disposable container can make it impossible to make an optical reading of a bar code on a label using a bar code reader because a layer of frost will block or diffract the light of the bar code reader. The container cannot be warmed up to remove frost as this would lead to destruction of the sample. The frost can be wiped off the disposable container but this contributes to an undesirable increase in the amount of time taken to read the sample.

It is known that disposable containers with Radio Frequency ID (RFID) tags can be used to monitor a plurality of disposable containers stored at low temperatures of down to −196° C.

In Europe and other countries outside of the US, RFID components for medical storage operate at an approved frequency of 13.56 MHz. It is important that the frequency used for the RFID tag does not lead to any undesirable interference with other electronic medical equipment. Lower medically approved frequency bands such as 125 KHz do not provide enough signal bandwidth to provide the tag with a useful user defined memory.

An RFID reader can be used to transmit an encoded radio signal to an RFID tag in order to interrogate it. Upon receiving the interrogation signal, the RFID tag transmits its identification information to the reader. This identification information may be a unique serial number assigned to a particular patient or to a particular sample.

Where old samples are stored in sealed cryogenic vials at cryogenic temperatures it is desirable to update recording, monitoring and auditing techniques by retrofitting stored cryogenic vials with RFID tags. In order to tag a sample which is already stored in a cryogenic vial under cryogenic conditions, one option is to adapt a cryogenic vial to include an RFID tag. However, this procedure can be complex and requires removal of the vial from the Dewar.

Another option is to transfer the sample from its vial to an RFID tagged vial. However, this would require the sample to be warmed up which is extremely undesirable as it will almost certainly lead to damage of the sample.

Where cryogenic vials of samples are stored together in standardized boxes, tagging of each sample in the box will take a considerable amount of time. Any amount of time that the Dewar is open to room temperature is undesirable.

STATEMENT OF INVENTION

The present invention aims to solve the above problems by providing, according to a first aspect, an RFID cap for a cryogenic vial, the RFID cap comprising a cap body; and an RFID tag attached to the cap body, the RFID tag comprising an RFID chip and an antenna connected to the chip.

In this way, retrofitting a stored sample in a cryogenic vial with an RFID tag does not require removal of the vial from the Dewar because the RFID cap can be attached to the vial whilst the vial remains inside the Dewar. This minimises the risk of damage to the sample during RFID tagging.

Preferably, the RFID tag includes a support medium which encapsulates the RFID chip and antenna.

Preferably, the support medium is an epoxy resin. Even more preferably, the support medium is an epoxy resin having a coefficient of expansion of less than 105 ppm/° C. (below Tg).

In this way, it is possible to minimize the variation in size of the support medium over the range of temperatures used. Preferably, the epoxy resin has a coefficient of expansion within the range of 95-105 ppm/° C. (below Tg).

The epoxy resin preferably has a high dielectric strength and is therefore a good insulating material. This means that the amount of radio frequency energy absorbed by the epoxy material during tag operation is reduced.

The epoxy resin preferably bonds to a wide variety of substances including silicon chips and copper wires.

The epoxy resin is preferably resilient to ethylene oxide gas and similar vapours and gases. An example of a suitable epoxy material is Tra-bond F123.

The encapsulating body may take the form of a solid disc. Where the RFID tag includes a disc shaped encapsulating body, the disc may have a diameter equal to that of the antenna or may have a diameter larger than the antenna.

Preferably the cap body includes a top portion and a wall extending from the top portion, the wall including attachment means.

Preferably the RFID tag is located at the top portion of the cap. In this way, the RFID cap enables a tagged vial to be easily accessed by an RFID reader.

Preferably, the top portion of the cap body includes positioning elements to align the RFID tag with the central axis of the cap. In this way, when an RFID reader is aligned with the central axis of the RFID cap, it will also be aligned with the central axis of the antenna of the RFID tag.

Optionally, the attachment means is configured to engage corresponding attachment means on the cryogenic vial such that, in use, the RFID cap is directly attached to the cryogenic vial.

In this way the cap of a sealed cryogenic vial in storage can be replaced with an RFID cap. Replacement of the cap with an RFID cap is advantageous over RFID tagging of the vial because the cryogenic vial itself (and therefore the sample) does not need to be removed from the Dewar during retrofitting of the RFID tag. This reduces the risk of damage to the sample during the retrofitting procedure because it is not necessary to expose the sample to laboratory temperatures outside of the Dewar.

For some types of biological samples only, the process of removing the cap from the cryogenic vial whilst the cryogenic vial remains inside the Dewar, will not damage the sample. The temperature of the biological sample should remain below −130° C. in order to avoid damage.

An advantage associated with removing the cap of a stored cryogenic vial and replacing it with an RFID cap (rather than attaching an RFID tag to the original cap itself) is that the RFID cap can be sized to have the same dimensions as the original cap of the cryogenic vial. This means that the RFID retrofitted vial will have the same dimensions as the originally sealed vial and will therefore remain compatible with other laboratory equipment.

Preferably the attachment means is a screw thread. The screw thread may be an internal screw thread or an external screw thread.

Optionally, the attachment means is configured to engage a cap of a sealed cryogenic vial such that, in use, the RFID cap is attached to the cryogenic vial via the cap.

In this way, it is not necessary to remove the original cap of a sealed cryogenic vial in order to retrofit the sample with an RFID tag. The RFID cap can be attached to a sealed cryogenic vial via the original cap which seals the cryogenic vial.

By eliminating the need to remove the cap of the sealed cryogenic vial, the risk of damage to the sample during the retrofitting procedure is reduced. This is particularly beneficial for biological samples where the removal of the cap which seals the cryogenic vial is not desirable or not permitted.

Preferably, the attachment means is a clip. In this way, the RFID cap can be pushed onto the cap of the sealed cryogenic vial in one simple motion thereby reducing the time taken to retrofit the vial with an RFID tag.

Preferably, the clip includes protrusions which, in use, engage the underside of the cap of the sealed cryogenic vial. In this way, the attachment of the RFID cap to the cap of the sealed cryogenic vial may be irreversible. The risk of the RFID cap separating from the vial during storage within the Dewar is therefore reduced.

The wall of the RFID cap may be continuous such that when the RFID cap engages the original cap the wall extends around the entire lid.

The wall of the RFID cap may be formed of discrete legs, each of which extends from the top portion of the cap body, each leg of the wall including attachment means.

According to a second aspect of the present invention, there is provided a cryogenic vial in combination with the RFID cap of the first aspect.

According to a third aspect of the present invention, there is provided an RFID box lid for a cryogenic vial storage box having an array of storage slots capable of receiving cryogenic vials; the RFID box lid comprising a box lid body; and an array of RFID tags positioned on the box lid such that when the box lid is located on the storage box, each RFID tag in the array is aligned with a storage slot in the box.

In this way, the location of each cryogenic vial within an entire storage box stored inside a Dewar can be labelled using RFID tags by simply replacing the lid of the storage box with the RFID box lid.

This provides a quick and efficient way of enabling RFID tracking of the location of stored cryogenic vials without the downsides involved in retrofitting each stored cryogenic vial itself.

The array of RFID tags may be a 10×10 array.
The array of RFID tags may be a 13×13 array.
The storage box may be a standard box size "SBS" (international standard). An RFID box lid for use with such storage boxes may have an array of RFID tags positioned for example in a 12×8 array or a 16×24 array.

Optionally, adjacent RFID tags in the array have a centre-to-centre spacing which is no more than 25 mm.

Optionally, adjacent RFID tags in the array have a centre-to-centre spacing which is no more than 13 mm.

Optionally, each RFID tag of the array is directly mounted onto the box lid body.

Optionally, each RFID tag of the array is mounted on a film; wherein the film attaches the array to the box lid body.

According to a fourth aspect of the present invention, there is provided a film comprising an array of RFID tags for use in the RFID box lid of the third aspect.

In this way, the original box lid can be retrofitted and no replacement box lid is required.

Optionally, the film includes a self-adhesive layer to enable attachment to the box lid and is preferably made from polypropylene.

Other methods of attaching the film to the box lid body include the use of a weld or suitable glue.

The array of RFID tags of the film may be a 10×10 array.
Adjacent RFID tags in the array may have a centre-to-centre spacing which is no more than 25 mm.

Adjacent RFID tags in the array may have a centre-to-centre spacing which is no more than 13 mm.

Returning to the first aspect of the present invention, the cap body of the RFID cap may be an insert which is locatable inside the cryogenic vial.

In this way, in use, the RFID cap/RFID insert is located inside of the sample cavity of the cryogenic vial.

When a cryogenic vial is tagged using such an RFID cap/RFID insert, the vial can no longer be used to store a biological sample.

Such an RFID cap/RFID insert provides a quick and easy way to transform a cryogenic vial of a standardised size and shape into an RFID tag. The tagged cryogenic vial can then be located inside a standard box or rack, the box or rack having a storage slot which is sized and shaped to receive cryogenic vials of the standardised size.

Such RFID caps/RFID inserts are particularly useful for use in the automation/robotic market where vials and/or boxed of vials are transferred from one location to another using machinery. In automation/robotic applications, vials are commonly referred to as tubes, and boxes are commonly referred to as racks. The terms vial and tube should therefore be understood to be interchangeable and the terms box and rack should be understood to be interchangeable.

The vial of a standardized size may be an industry standard "384 tube" which may have a square cross section but may also have another shape such as a circular cross section.

The standardised cryogenic vial may be a cryogenic vial of a standardised size having a diameter of 12 mm (and a volume of 2 ml).

The antenna of the RFID tag may be a loop antenna which loops around a central axis, wherein each of the one or more loops has a suitable shape such as circular, square, rectangular or elliptical.

The antenna may be positioned such that when the RFID cap is located inside a cryogenic vial, the central axis of the looped antenna aligns with the longitudinal axis of the cryogenic vial.

Optionally, the antenna may be created from a coil of wire. Where the antenna is created from a coil of wire, it may extend along the central axis in a "solenoid style" so that the antenna itself has a longitudinal dimension which may or may not be aligned with the longitudinal axis of the vial when the RFID cap is in use.

The RFID tag may further comprise a ferrite core around which the antenna is wound.

The ferrite core preferably extends along the longitudinal axis of the RFID cap such that, when the RFID cap is located inside of the cryogenic vial, the ferrite coil extends along the longitudinal axis of the sample cavity of the vial.

The cap body preferably surrounds the RFID tag.

According to a fifth aspect of the present invention, there is provided a box for storing cryogenic vials, in combination with the cryogenic vial having the RFID cap of the present invention; the box including a plurality of slot, each slot for receiving a cryogenic vial, the cryogenic vial with the RFID cap being locatable in one of the plurality of slots.

By locating the cryogenic vial with the RFID cap in a slot of the box, the RFID cap provides RFID identification of the box that can then be read using a standard RFID reader.

The plurality of slots preferably includes an array of slots surrounded by an outer perimeter of the box; and an extra slot located at a position on the outer perimeter of the box, the cryogenic vial being located in the extra slot.

Alternatively, or additionally, a cryogenic vial containing the RFID cap of the present invention may be located in any one of the slots which make up the array of slots of the box.

The extra slot may be sized to receive a standard "384 tube" irrespective of the size of the slots in the array of the box.

The cryogenic vial may include a 2D barcode in addition to the RFID cap.

The present invention will now be disclosed by way of example only, with reference to the accompanying figures, in which.

DETAILED DESCRIPTION

Figure 1A:
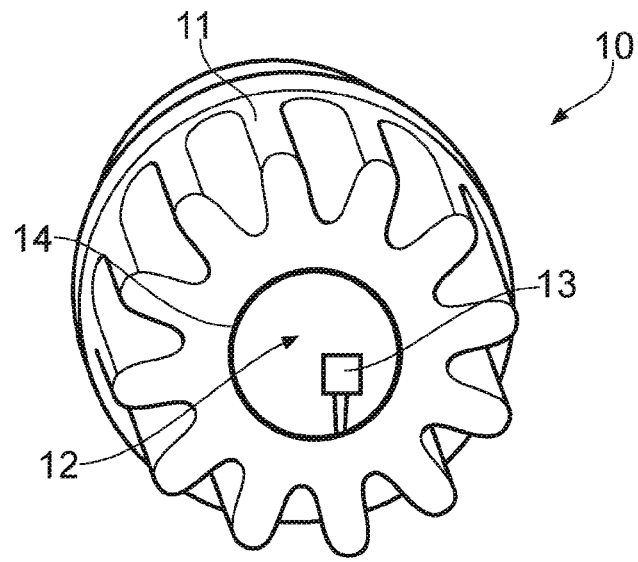
FIG. 1a shows a perspective view of a first embodiment of an RFID cap of the present invention from above, i.e. from a point closest to the top portion of the RFID cap.
Figure 1B:
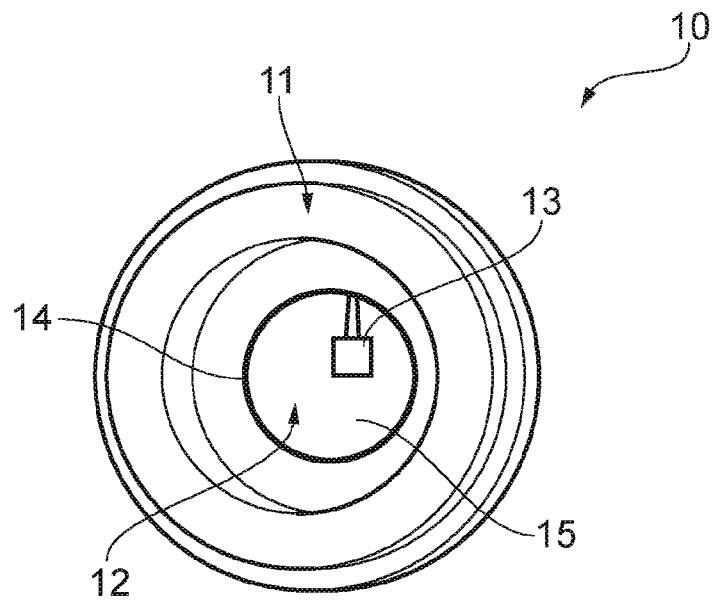
FIG. 1b shows a perspective view from below, i.e. from a point closest to the bottom of the RFID cap.
Figure 2:
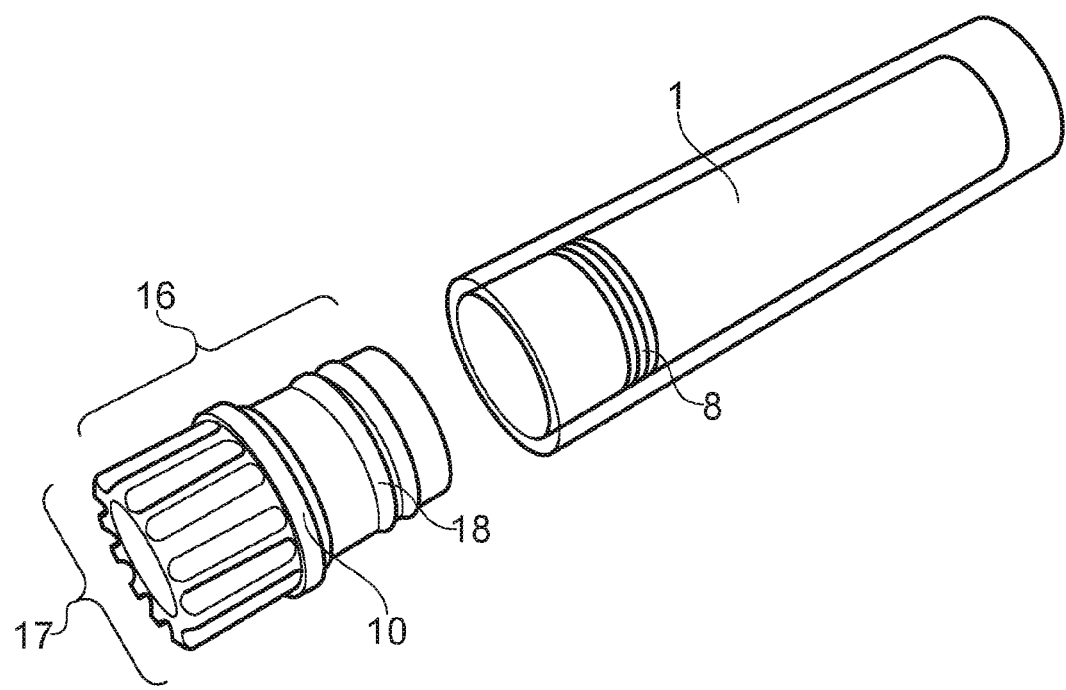
FIG. 2 shows a perspective view of a cryogenic vial and the RFID cap of FIGS. 1a and 1b.

Referring to FIGS. 1a, 1b and 2, a first embodiment of an RFID cap 10 for a cryogenic vial 1 is shown comprising a cap body 11 and an RFID tag 12 attached to the cap body 11. The RFID tag 12 includes an RFID chip 13 and an antenna 14 connected to the RFID chip 13.

A support medium 15 supports the chip 13 and antenna 14 in their connected configuration. The chip 13 of the antenna is located inside coils of the antenna. In the embodiment shown in FIGS. 1a, 1b and 2, the support medium is an encapsulating body which encapsulates the chip 13 and antenna 14. The encapsulating body takes the form of a solid disc.

The cap body 11 of the RFID cap 10 includes a top portion 17 and a wall 16 extending away from the top portion. The RFID tag 12 is located at the top portion of the cap body 11. In the RFID cap of FIGS. 1a, 1b and 2, the RFID tag is attached to the inner surface of the cap at the top portion of the cap body. However, because the cap body is made of transparent material, the RFID tag 11 is visible in FIG. 1a when the external surface of the RFID cap is viewed from above.

The terms top and bottom are meant to have their usual meaning. When the RFID cap is in use, i.e. when it is attached to a vial 1, the bottom of the RFID cap is the end of the cap in contact with the vial 1, and the top portion of the RFID cap is the end of the cap which is furthest from the vial 1.

In the embodiment of the RFID cap shown in FIGS. 1a, 1b and 2, the wall 16 is cylindrical and includes attachment means 18 located at the bottom of the RFID cap. As shown in FIG. 2, which shows the RFID cap 11 and corresponding vial 1, the attachment means 18 are configured to engage corresponding attachment means 8 on the cryogenic vial so that when the cap is used to tag the cryogenic vial 1, the RFID cap 11 is attached to the cryogenic vial 1 directly. In the embodiment shown in FIGS. 1a, 1b and 2, the attachment means is a screw thread on the external surface of the cap body, the screw thread being configured to engage a corresponding screw thread on the internal surface of the cryogenic vial.

Figure 3:
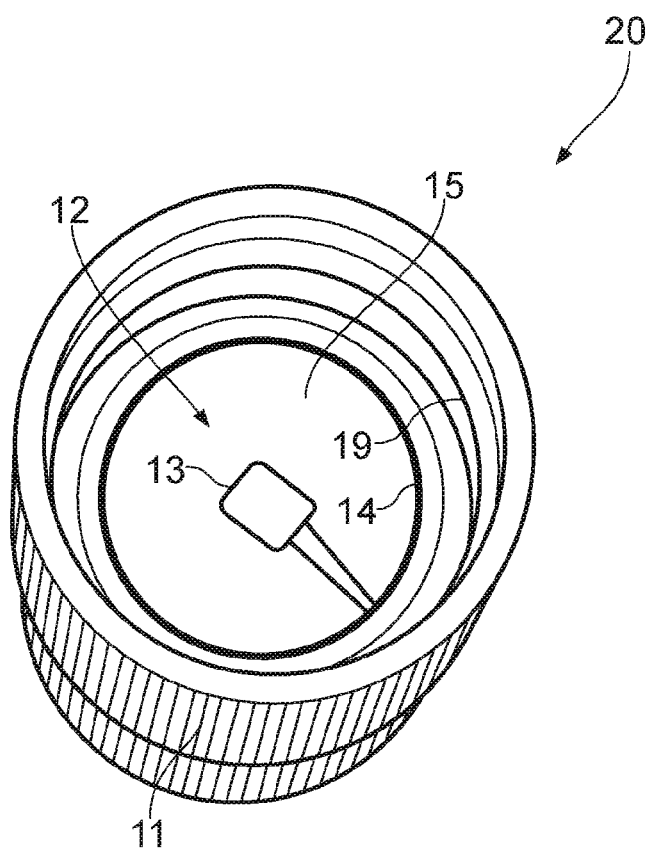
FIG. 3 shows a perspective view of a second embodiment of an RFID cap of the present invention.
Figure 4:
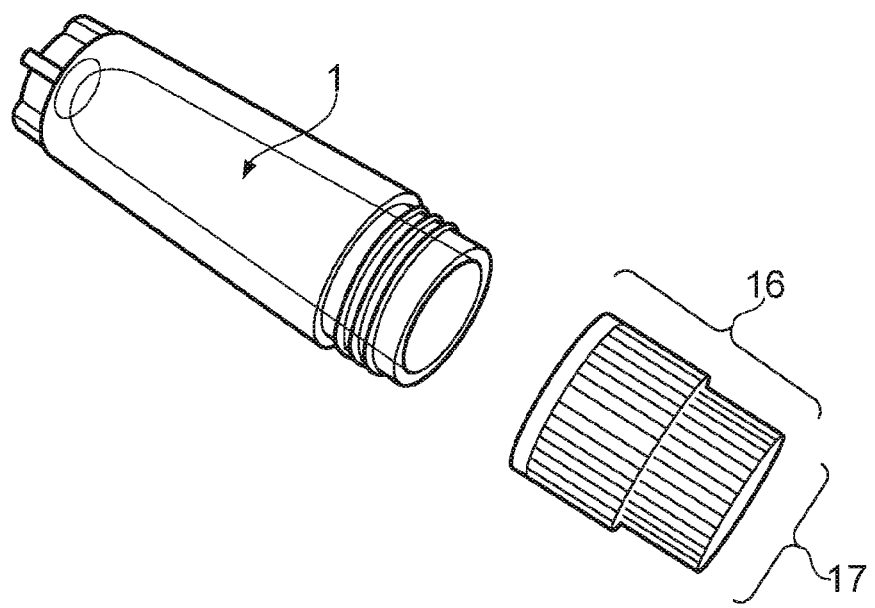
FIG. 4 shows a perspective view of a cryogenic vial and the RFID cap of FIG. 2.

A second embodiment of the RFID cap 20 is shown in FIGS. 3 and 4, where like reference numerals correspond to the same features as those described in relation to the first embodiment of FIGS. 1a, 1b and 2. The second embodiment differs from the first embodiment in that the attachment means 19 (in the form of a screw thread) is located on the inside surface of the cap body 11 rather than the outside surface.

For the RFID caps 10, 20, 30 shown in FIGS. 1a, 1b, 2, 3 and 4, the attachment means is a screw thread. However, other types of attachment means such as protrusions or grooves could be located on the inside surface or outside surface of the cap body instead of a screw thread.

Figure 5:
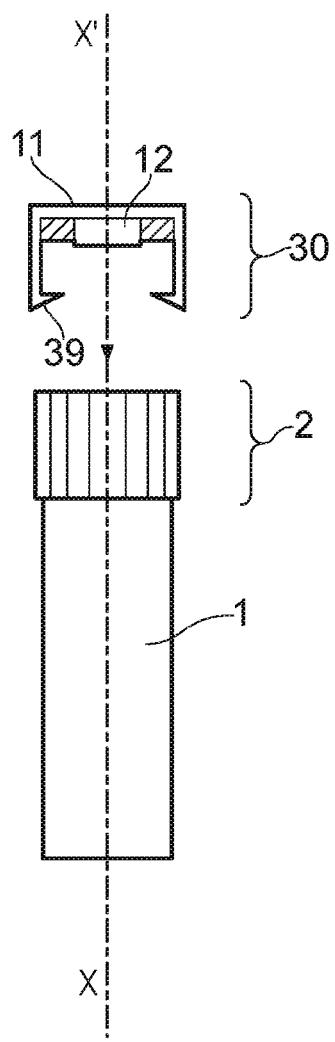
FIG. 5 shows a side view of a cryogenic vial, a cap of a sealed cryogenic vial, and an RFID cap according to a third embodiment of the RFID cap of the present invention.

A third embodiment of the RFID cap 30 is shown in FIG. 5. In this embodiment, the RFID cap 30 is configured to engage a cap 2 of a sealed cryogenic vial 1 so that, in use, the RFID cap 30 is attached to the cryogenic vial via the (original) cap 2 rather than attaching directly to the vial 1.

As with previous embodiments, the RFID cap of the third embodiment includes a cap body 11 and an RFID tag 12 attached to the cap body 11. The RFID tag 12 includes an RFID chip 13 and an antenna (not shown in FIG. 5) connected to the RFID chip 13. The cap body 11 of the RFID cap 30 includes a top portion and a wall extending away from the top portion. The RFID tag 12 is located at the top portion of the cap body 11.

Protrusions 39 protrude from the wall of the cap body 11 to form a clip which acts as an attachment means. When the RFID cap is attached to the cryogenic vial via the cap 2, the protrusions 39 engage the underside of the cap 2 thereby holding the RFID cap 30 in place over the cap 2. The clip may form an irreversible connection between the RFID cap 30 and the cap 2.

When the RFID cap 30 is attached to the cap 2 of the sealed cryogenic vial, the central axis of the RFID tag 12 is aligned with the central axis of the cap 2 and therefore with the central axis X-X' of the cryogenic vial 1.

Figure 6:
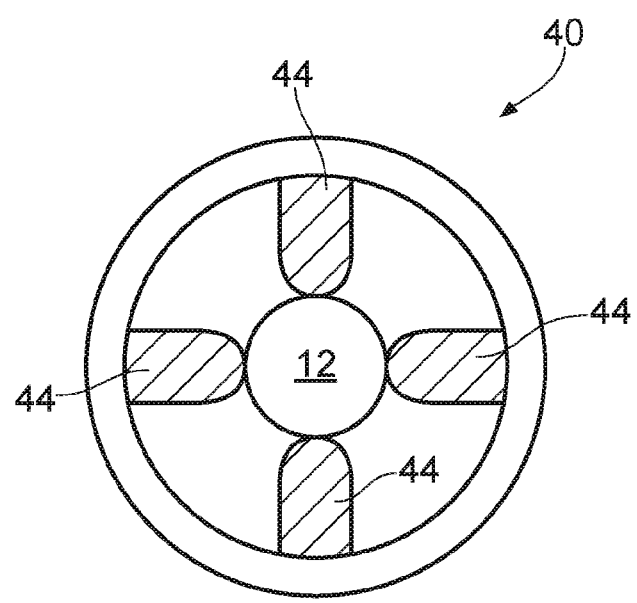
FIG. 6 shows a plan view of a fourth embodiment of the RFID cap of the present invention.

A fourth embodiment of the RFID cap 40 is shown in FIG. 6. The top portion of the cap body 40 includes positioning elements 44 to align the RFID tag with the central axis of the cap. In the embodiment shown in FIG. 4 there are 4 positioning elements spaced at 90° intervals to form two pairs of opposing structures. Each positioning element protrudes inwardly from the wall of the RFID cap to the centre of the RFID cap.

In this way, when an RFID reader is aligned with the central axis of the RFID cap, it will also be aligned with the central axis of the RFID tag. The features of this fourth embodiment may be present in combination with some or all of the features of previous embodiments.

Figure 7:
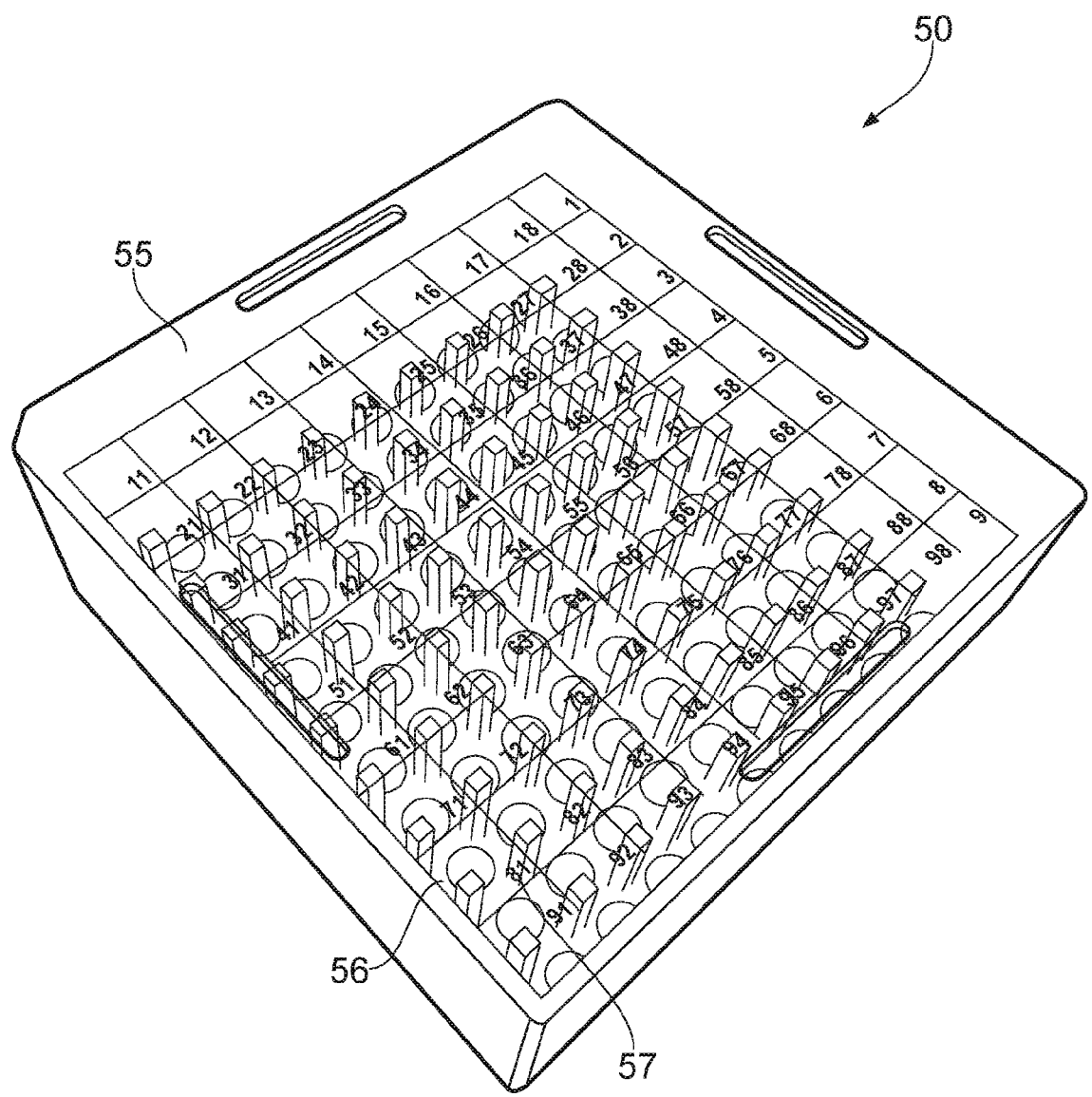
FIG. 7 shows a perspective view of a known standardized storage box for cryogenic vials.

FIG. 7 shows a known standardized storage box 50 having an array of storage slots 56, each slot being capable of receiving a cryogenic vial. The storage box shown in FIG. 7 includes 100 slots arranged in a 10×10 array. A box lid is used to cover the storage box. The box lid includes a grid of identification numbers 57, each identification number 57 being aligned with a slot 56 in the storage box when the lid is in use.

Figure 8:
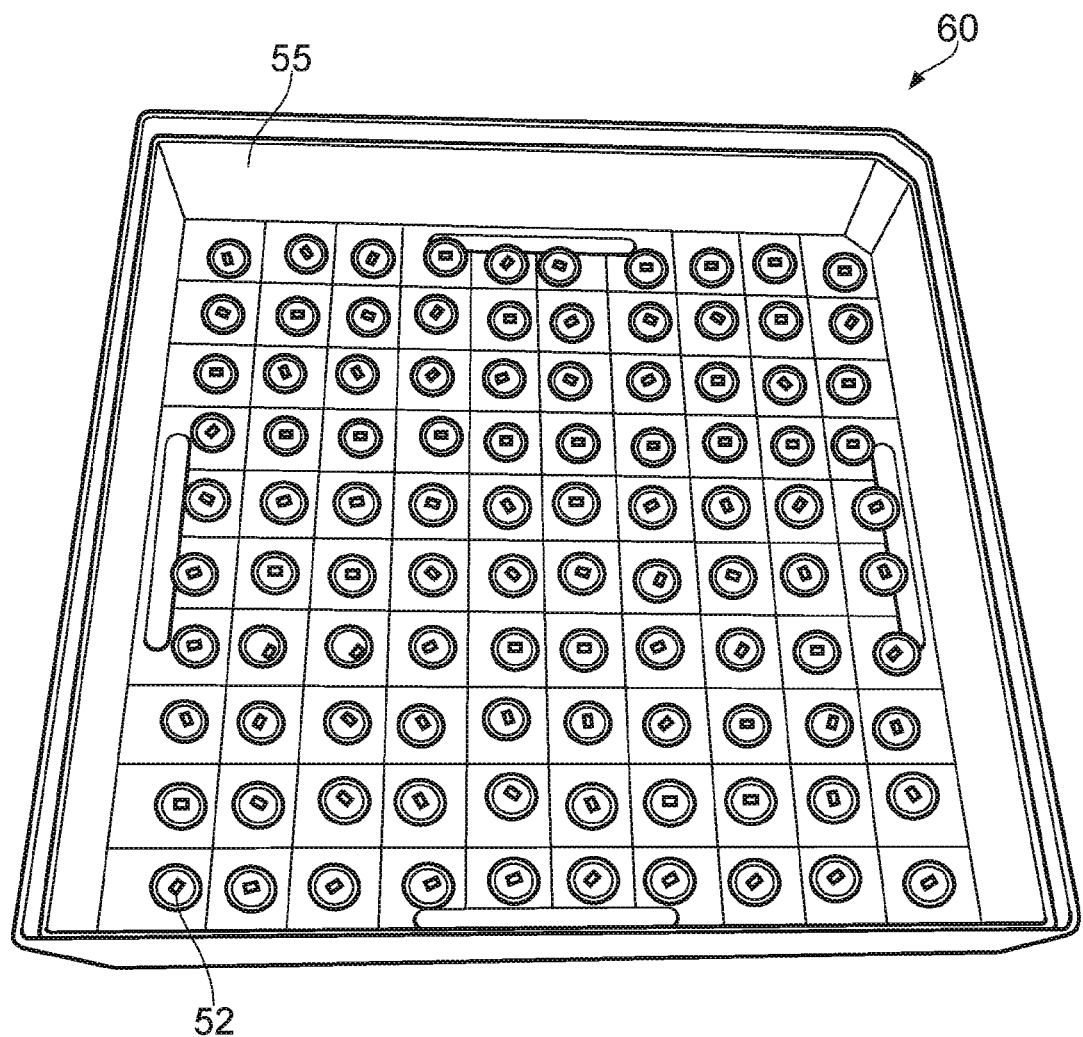
FIG. 8 shows a perspective view of an RFID box lid.

FIG. 8 shows an RFID box lid 60 according to the present invention, the RFID box lid being suitable for use with a standardized storage box such as that shown in FIG. 7. The RFID box lid 60 comprises a box lid body 55 and an array of RFID tags 52, each RFID tag 52 being positioned on the box lid such that when the box lid is in use covering the storage box, the RFID tag is aligned with a storage slot in the box for a cryogenic vial. Each RFID tag therefore acts as an identification reference for the sample located in the slot with which it is aligned.

In an alternative embodiment (not shown) the box lid body of the RFID box lid includes an array of cylindrical recesses, each recess configured to receive a disc-shaped RFID tag. The RFID tags may be held in place by a layer or film of polypropylene attached over the array of recesses and RFID tags therein.

Figure 9:
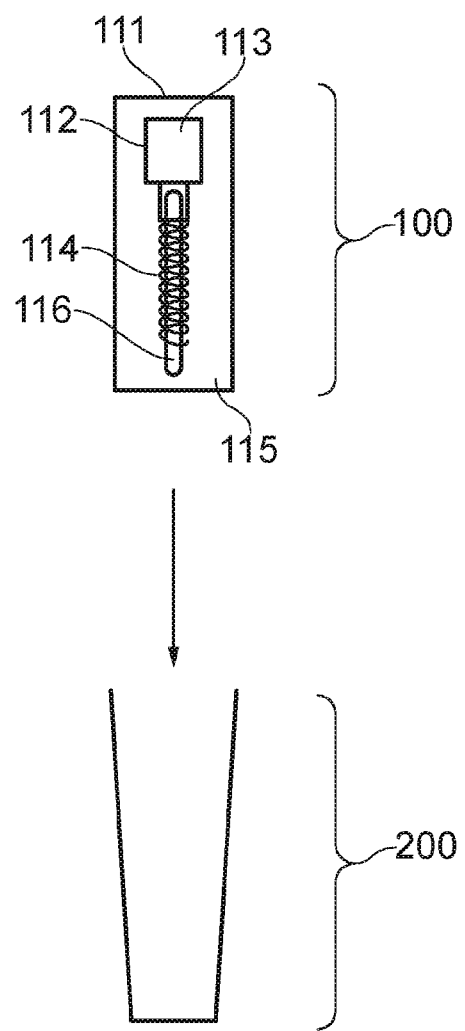
FIG. 9 shows a schematic diagram of an RFID cap and a cryogenic vial where the cap body is an insert which is locatable inside the cryogenic vial.
Figure 10:
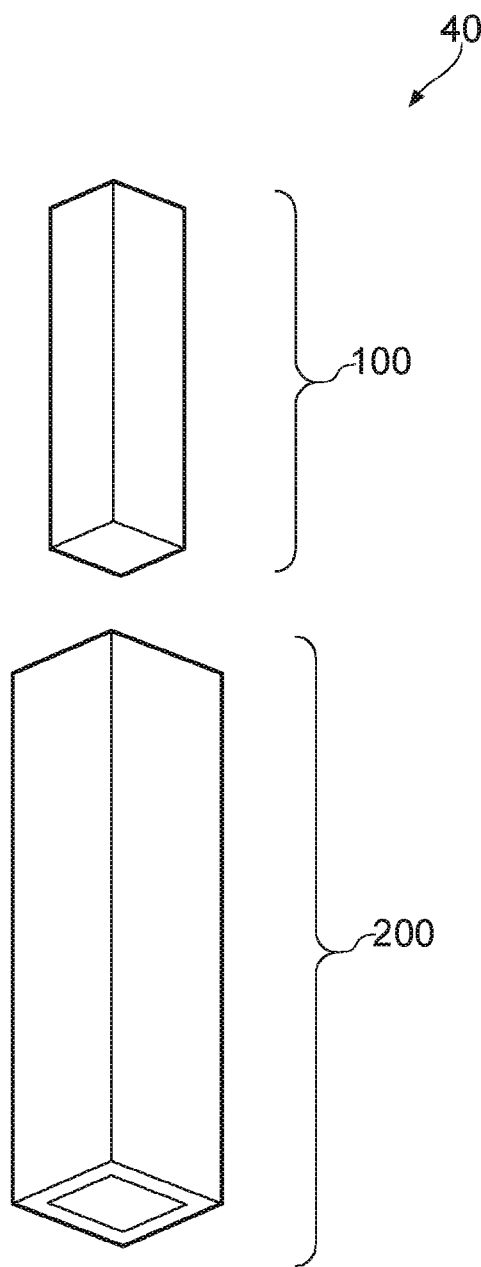
FIG. 10 shows a perspective view of the RFID cap and cryogenic vial of FIG. 9.

Referring to FIGS. 9 and 10, a fifth embodiment of the RFID cap 100 is shown along with a cryogenic vial 200. The RFID cap 100 includes a cap body 111 and an RFID tag 112. The RFID tag 112 includes an RFID chip 113 and an antenna 114 connected to the RFID chip 113.

A support medium 115 supports the chip 113 and antenna 114 in their connected configuration. The antenna is a loop antenna wound around a ferrite core 116 and the chip 113 of the RFID tag is located at one side of the coils of the antenna. The support medium 115 is an encapsulating body which encapsulates the chip 113 and antenna 114.

The RFID cap 100 is an insert with a cap body 111 which is locatable inside the cryogenic vial 200 as indicated by the arrow in FIG. 9. Epoxy may be used to bond the RFID cap/RFID insert to the vial (tube).

Figure 11:
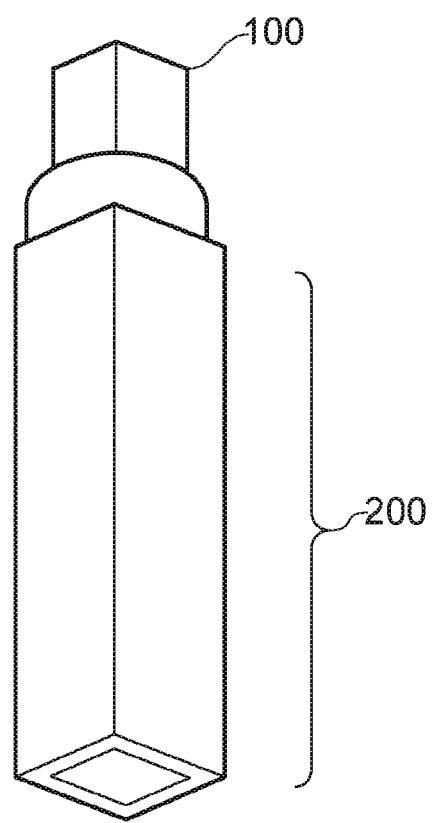
FIG. 11 shows the RFID cap and cryogenic vial of FIG. 10, when the RFID cap/RFID insert is located inside the cryogenic vial.

FIG. 11 shows the RFID cap and cryogenic vial of FIGS. 9 and 10, when the RFID cap/RFID insert is located inside the cryogenic vial. The cap body 111 of the RFID cap 100 is shaped to fit into a specific cryogenic vial.

The cryogenic vial shown in the embodiments of FIGS. 9-11 is an industry standard "384 tube".

The cap body 111 of the RFID cap 100 may formed by the support medium 115. Alternatively the cap body 111 may be formed of a different material to the support medium.

Regardless of how the cap body 111 is formed, the cap body 111 may be manufactured separately to the cryogenic vial and then fitted into the vial as shown in FIGS. 9 and 10.

Alternatively, the cap 100 may be formed by placing the RFID tag 112 into a cryogenic vial 200 and then pouring an encapsulating material such as epoxy into the vial which then sets to form the support medium of the RFID cap. In this case, the support medium itself forms the cap body.

In another embodiment (not shown) the upmost part of the RFID cap is shaped such that when the RFID cap is inside the cryogenic vial, the upmost part of the RFID cap is either level with or below the top of the vial. For such an embodiment, the RFID cap includes the features discussed in relation to the embodiment shown in FIGS. 9-11. However, unlike the embodiment shown in FIG. 11, the RFID cap 100 does not protrude from the vial 200 when it is placed inside of the vial.

In an alternative embodiment (not shown), the antenna is positioned so that when the RFID cap is placed inside a cryogenic vial, the central axis of the antenna is at an angle to the longitudinal axis of the cryogenic vial. For example, the antenna may be positioned such that its central axis is transverse to the longitudinal axis of the vial. In this way, the looped antenna will be "looking outwardly" from the side of the cryogenic vial, rather than looking along the longitudinal axis of the vial as in the embodiment shown in FIGS. 9-11.

Optionally, the antenna may be formed by printing onto a circuit board (PCB). An antenna is preferably a "spiral" antenna. A PCB antenna may be made up of a single spiral but may take the form of a multilayer antenna which includes a first spiral antenna on a first PCB layer and a second spiral antenna on a second PCB layer.

Figure 12:
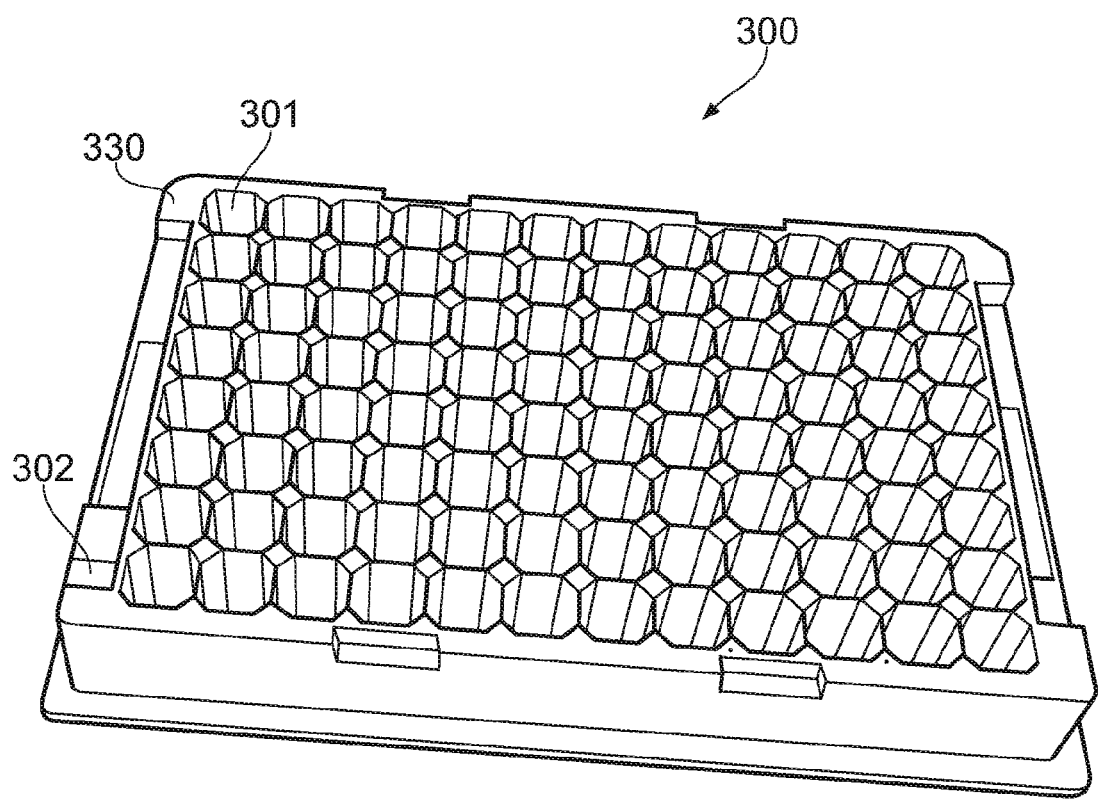
FIG. 12 shows a top view of a box for storing vials.
Figure 13:
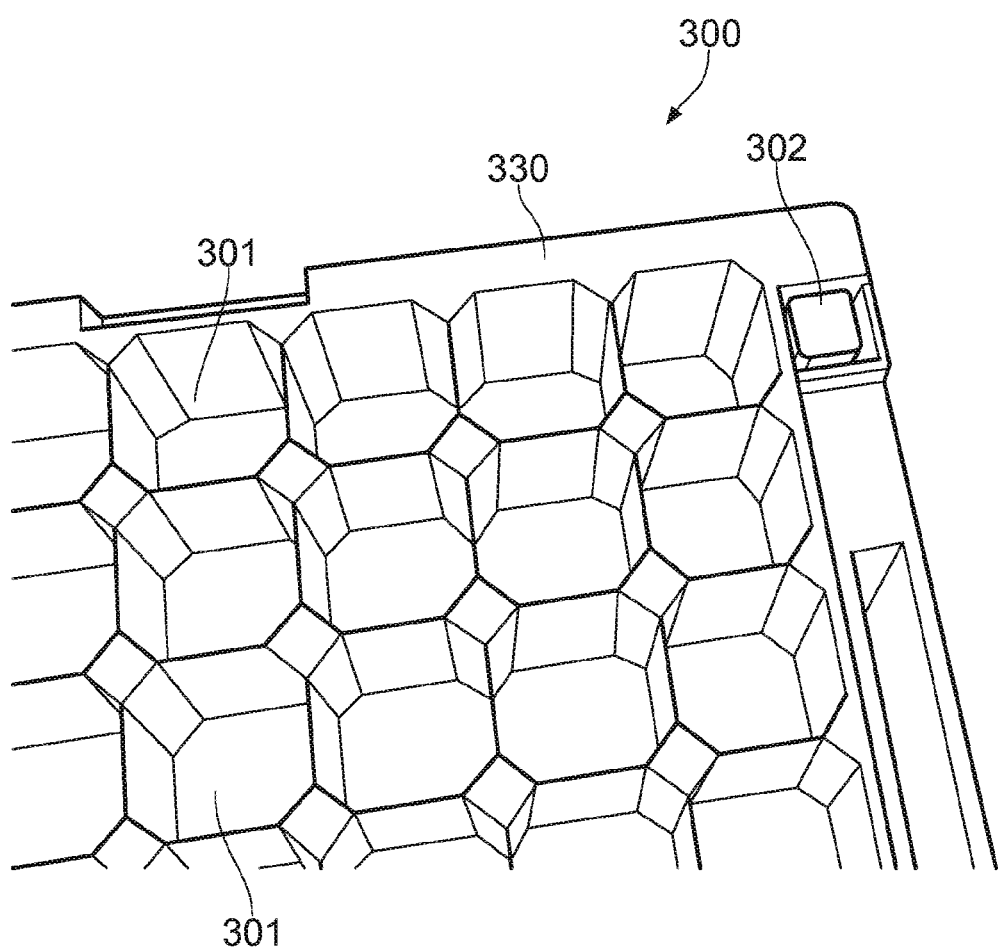
FIG. 13 shows an enlarged view of the box of FIG. 12, highlighting the position for the cryogenic vial which includes the RFID cap.
Figure 14:
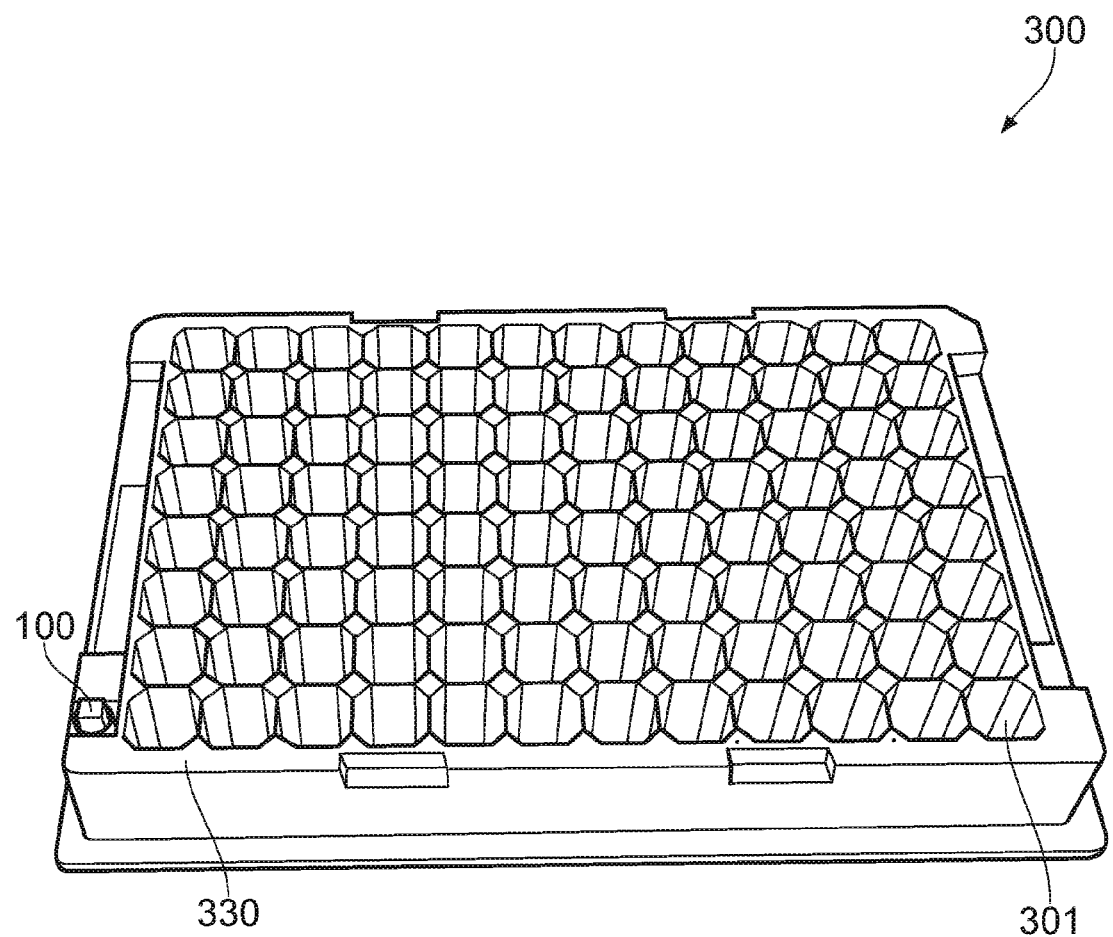
FIG. 14 shows a top view of a box for storing vials according to a fifth aspect of the present invention, the box including the cryogenic vial and RFID cap.
Figure 15:
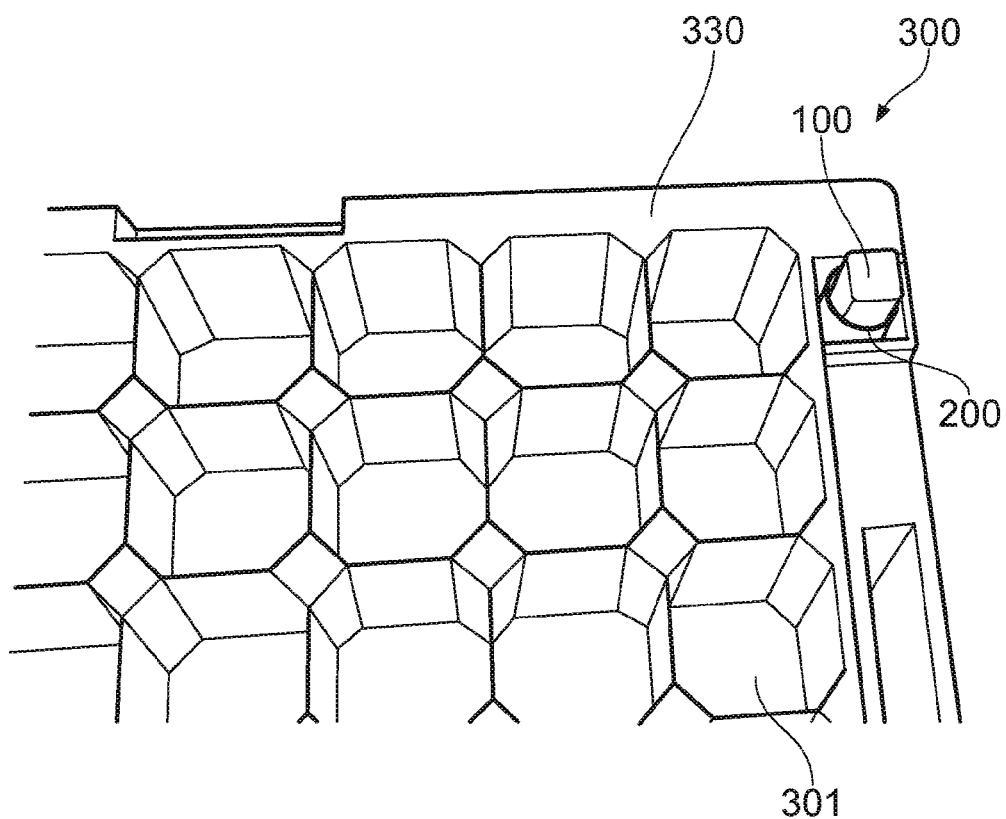
FIG. 15 shows an enlarged view of the box of FIG. 14, highlighting the position of the cryogenic vial which includes the RFID cap.
Figure 16:
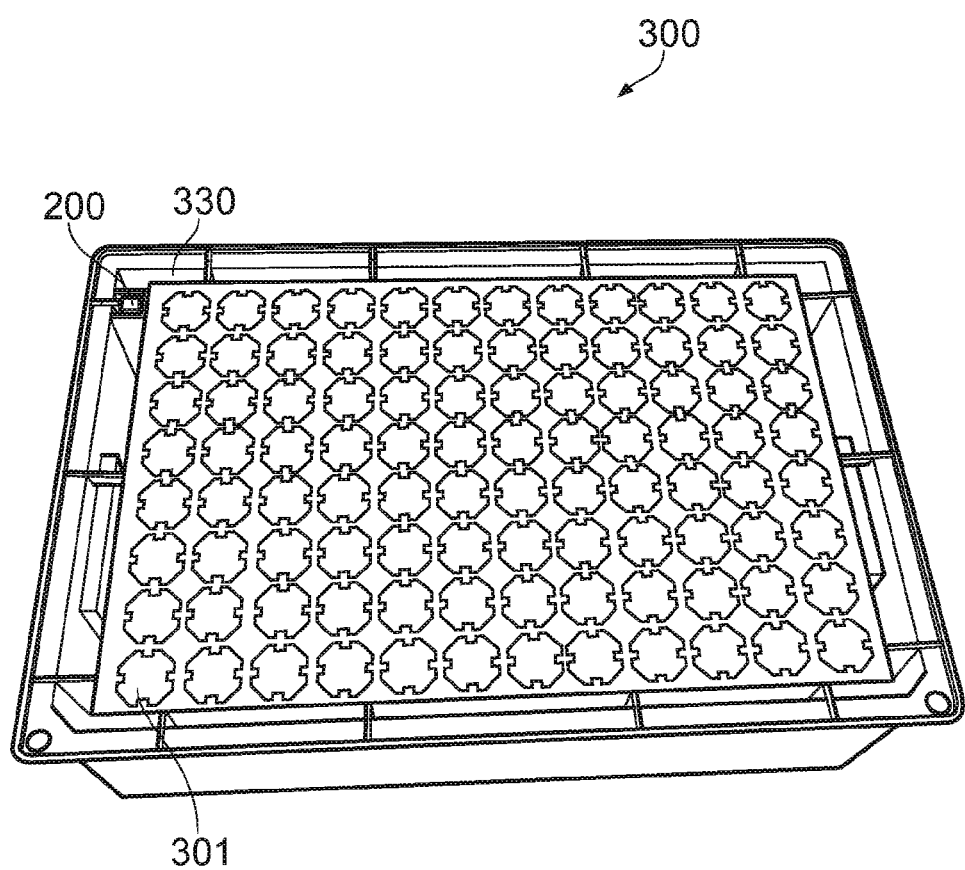
FIG. 16 shows a view taken from underneath of a box for storing vials according to a fifth aspect of the present invention.
Figure 17:
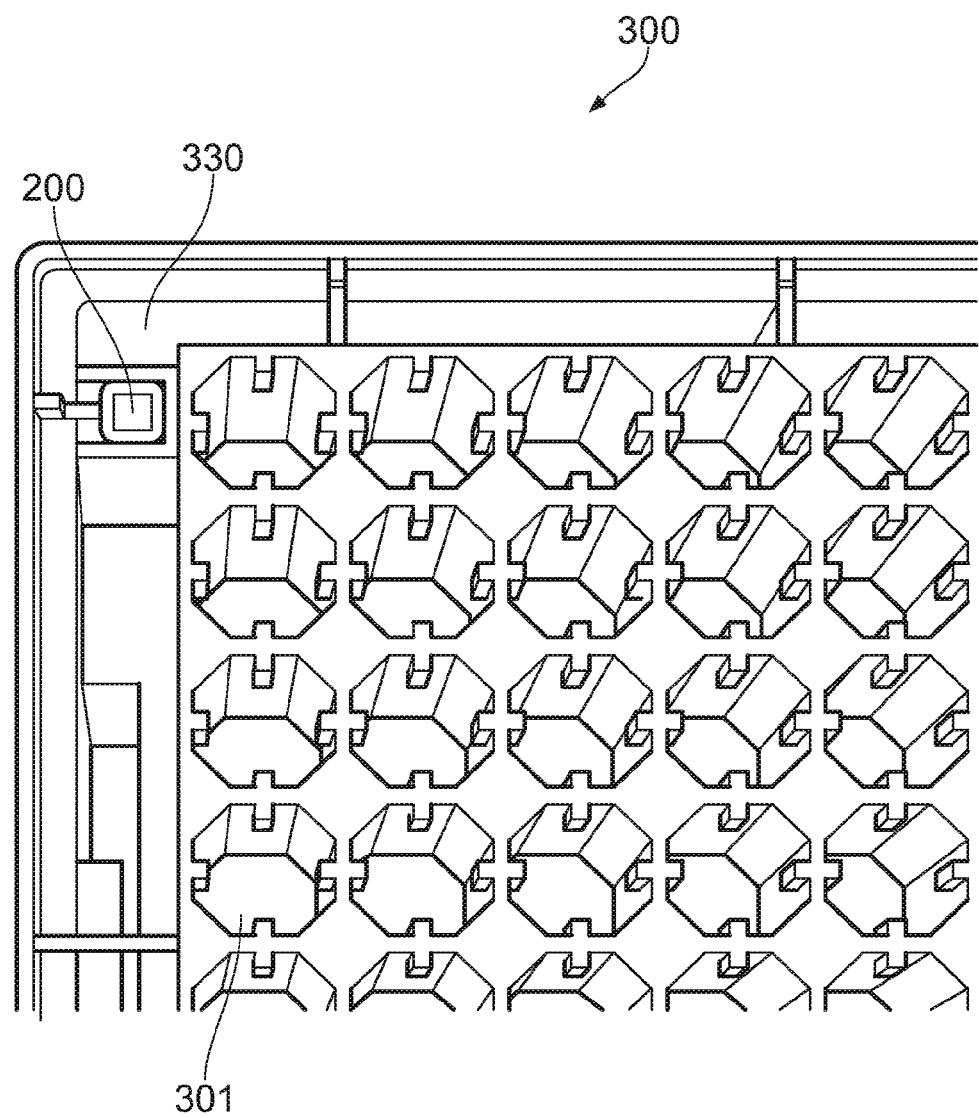
FIG. 17 shows an enlarged view of the box of FIG. 16, highlighting the position of the cryogenic vial which includes the RFID cap.

Referring to FIGS. 12-17, a box 300 suitable for storing cryogenic vials is shown which includes a cryogenic vial 200 and RFID cap 100 as shown in FIGS. 9-11. FIGS. 12 and 13 show a top view of the box without the RFID cap, FIGS. 14 and 15 show a top view of the box with the RFID cap, and FIGS. 16 and 17 show the box including the cryogenic vial 200 (and RFID cap 100) as viewed from underneath.

The box 300 includes a plurality of slots 301 for receiving cryogenic vials 200. In the box shown in FIGS. 12-17, the plurality of slots 301 are arranged in an 8×12 array.

The array of slots 301 are surrounded by an outer perimeter of the box 330 and an extra slot 302 is positioned on this perimeter 330 of the box 300. Cryogenic vial 200 (which includes RFID cap 100) is located in this extra slot. In this way, the box can be provided with RFID identification whilst keeping all slots in the array of slots free to be used to store vials which contain a sample.

The box may include an alternate array of slots with any number n×m of slots.

In another embodiment (not shown) the RFID cap is shaped such that when it is inside the cryogenic vial, the upmost part of the RFID cap is level with or below the top of the vial. For such an embodiment, the box includes the features discussed in relation to the embodiment shown in FIGS. 12 and 13. However, unlike the embodiment shown in FIGS. 12 and 13, the RFID cap 100 does not protrude from the vial 200 when it is placed inside of the vial. This means that the RFID cap of a cryogenic vial located in one of the slots of the box will not protrude above the upper surface of the box as is the case for the box shown in FIGS. 14 and 15.

The foregoing description of the preferred embodiments of the invention have been presented for purposes of illustration and description, it is not intended to be exhaustive or to limit the invention to the precise form disclosed, and modifications and variations are possible in light of the above teachings.

It is intended that the scope of the invention be defined by the claims appended hereto.

The invention claimed is:

1. A RFID cap for a cryogenic vial, the cryogenic vial comprising:

a tubular wall defining a sample cavity for storage of a sample, wherein the sample cavity has a length greater than half of a length of the cryogenic vial, and wherein the cryogenic vial is adapted to withstand cryogenic freezing of the sample;

a base; and an accessible end, the base and the accessible end being at opposing ends of the tubular wall, the sample cavity being accessible at the accessible end of the cryogenic vial and the RFID cap being configured to be fitted at the accessible end of the cryogenic vial, the RFID cap comprising:

a cap body; and an RFID tag attached to the cap body, the RFID tag comprising an RFID chip and an antenna connected to the RFID chip, wherein the RFID tag includes a support medium which encapsulates the RFID chip and antenna, and wherein the support medium is a solid disc.

2. The RFID cap of claim 1, wherein the support medium is an epoxy resin.

3. The RFID cap of claim 1, wherein the cap body includes a top portion and a wall extending from the top portion, the wall including attachment means.

4. The RFID cap of claim 3, wherein the RFID tag is located at the top portion of the cap body, and wherein the top portion of the cap body includes positioning elements to align the RFID tag with a central axis of the RFID cap.

5. The RFID cap of claim 4, wherein the top portion of the cap body includes positioning elements to align the RFID tag with a central axis of the RFID cap.

6. The RFID cap of claim 3, wherein the attachment means is configured to engage corresponding attachment means on the cryogenic vial such that, in use, the RFID cap is directly attached to the cryogenic vial.

7. The RFID cap of claim 6, wherein the attachment means is a screw thread.

8. The RFID cap of claim 3, wherein the attachment means is configured to engage a cap of a sealed cryogenic vial such that, in use, the RFID cap is attached to the cryogenic vial via the cap.

9. The RFID cap of claim 8, wherein the attachment means is a clip, and wherein the clip includes protrusions which, in use, engage an underside of the cap of the sealed cryogenic vial.

10. The RFID cap of claim 8, wherein the attachment means includes protrusions which, in use, engage an underside of the cap of the sealed cryogenic vial.

11. The RFID cap of claim 8, wherein the cap body is an insert which is locatable inside the cryogenic vial.

12. The RFID cap of claim 11, wherein the RFID tag further comprises a ferrite core around which the antenna is wound.

13. A cryogenic vial including:

a vial body comprising:

a tubular wall defining a sample cavity for storage of a sample, wherein the sample cavity has a length greater than half of a length of the cryogenic vial, and wherein the cryogenic vial is adapted to withstand cryogenic freezing of the sample;

a base; and an accessible end, the base and the accessible end being at opposing ends of the tubular wall, the sample cavity being accessible at the accessible end of the vial body; and an RFID cap at the accessible end of the vial body that includes:

a cap body; and an RFID tag attached to the cap body, the RFID tag comprising an RFID chip and an antenna connected to the RFID chip;

wherein the cap body is an insert located inside the vial body, wherein the RFID tag includes a support medium which encapsulates the RFID chip and antenna, and wherein the support medium is a solid disc.

14. The cryogenic vial of claim 13, wherein the RFID tag further comprises a ferrite core around which the antenna is wound.

15. A system including:

a box that includes a plurality of slots, each slot being configured to receive a cryogenic vial; and a cryogenic vial comprising:

a tubular wall defining a sample cavity for storage of a sample, wherein the sample cavity has a length greater than half of a length of the cryogenic vial, and wherein the cryogenic vial is adapted to withstand cryogenic freezing of the sample;

a base; and an accessible end, the base and the accessible end being at opposing ends of the tubular wall, the sample cavity being accessible at the accessible end of the cryogenic vial, the cryogenic vial further including a cap fitted at the accessible end of the cryogenic vial, the cap comprising:

a cap body; and an RFID tag attached to the cap body, the RFID tag comprising an RFID chip and an antenna connected to the RFID chip, wherein the RFID tag includes a support medium which encapsulates the RFID chip and antenna, wherein the support medium is a solid disc, and wherein the RFID tag and the plurality of slots are configured such that the cryogenic vial is locatable in one of the plurality of slots.

16. The system of claim 15; wherein the plurality of slots includes an array of slots surrounded by an outer perimeter of the box; and an extra slot located at a position on the outer perimeter of the box, the cryogenic vial being located in the extra slot.

* * * * *

UNITED STATES PATENT AND TRADEMARK OFFICE
CERTIFICATE OF CORRECTION

PATENT NO.       : 10,748,050 B2
APPLICATION NO.  : 14/772743
DATED            : August 18, 2020
INVENTOR(S)      : Geoffrey Morris et al.

Page 1 of 1

It is certified that error appears in the above-identified patent and that said Letters Patent is hereby corrected as shown below:

In the Specification

In Column 4, Lines 5-8, delete "Preferably, the attachment means is a clip. In this way, the RFID cap can be pushed onto the cap of the sealed cryogenic vial in one simple motion thereby reducing the time taken to retrofit the vial with an RFID tag." and insert the same on Column 4, Line 4, as a continuation of the same paragraph.

In Column 9, Lines 62-63, delete "It is intended that the scope of the invention be defined by the claims appended hereto." and insert the same on Column 9, Line 61, as a continuation of the same paragraph.

In the Claims

In Column 9, Line 66, in Claim 1, delete "A" and insert -- An --, therefor.

In Column 10, Line 49, in Claim 11, delete "claim 8," and insert -- claim 1, --, therefor.

In Column 12, Line 17, in Claim 16, delete "claim 15;" and insert -- claim 15, --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*